US012049684B2

(12) United States Patent
Yoshida et al.

(10) Patent No.: US 12,049,684 B2
(45) Date of Patent: *Jul. 30, 2024

(54) COPPER POWDER AND METHOD FOR PRODUCING SAME

(71) Applicant: Dowa Electronics Materials Co., Ltd., Tokyo (JP)

(72) Inventors: Masahiro Yoshida, Tokyo (JP); Kenichi Inoue, Tokyo (JP); Atsushi Ebara, Tokyo (JP); Yoshiyuki Michiaki, Tokyo (JP); Takahiro Yamada, Tokyo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,614

(22) Filed: May 12, 2023

(65) Prior Publication Data

US 2023/0279523 A1 Sep. 7, 2023

Related U.S. Application Data

(63) Continuation of application No. 16/473,353, filed as application No. PCT/JP2017/045934 on Dec. 21, 2017, now Pat. No. 11,692,241.

(30) Foreign Application Priority Data

Dec. 28, 2016 (JP) ................................ 2016-255186
Dec. 19, 2017 (JP) ................................ 2017-242314

(51) Int. Cl.
*B22F 1/10* (2022.01)
*B22F 1/05* (2022.01)
(Continued)

(52) U.S. Cl.
CPC .............. *C22C 1/0425* (2013.01); *B22F 1/05* (2022.01); *B22F 1/10* (2022.01); *B22F 9/082* (2013.01);
(Continued)

(58) Field of Classification Search
CPC ........... C22C 1/0425; C22C 9/00; C22C 9/01; C22C 9/02; C22C 9/04; C22C 9/05;
(Continued)

(56) References Cited

U.S. PATENT DOCUMENTS 11,692,241 B2 * 7/2023 Yoshida ................ H01B 1/026 75/247
2002/0149005 A1 10/2002 Khattar et al.
(Continued)

FOREIGN PATENT DOCUMENTS

EP 2851907 A1 3/2015
JP H083486 A 1/1996
(Continued)

*Primary Examiner* — Vanessa T. Luk
(74) *Attorney, Agent, or Firm* — Bachman & LaPointe, P.C.

(57) ABSTRACT

There are provided an inexpensive copper powder, which has a low content of oxygen even it has a small particle diameter and which has a high shrinkage starting temperature when it is heated, and a method for producing the same. While a molten metal of copper heated to a temperature, which is higher than the melting point of copper by 250 to 700° C. (preferably 350 to 650° C. and more preferably 450 to 600° C.), is allowed to drop, a high-pressure water is sprayed onto the heated molten metal of copper in a non-oxidizing atmosphere (such as an atmosphere of nitrogen, argon, hydrogen or carbon monoxide) to rapidly cool and solidify the heated molten metal of copper to produce a copper powder which has an average particle diameter of 1 to 10 μm and a crystallite diameter $Dx_{(200)}$ of not less than
(Continued)

40 nm on (200) plane thereof, the content of oxygen in the copper powder being 0.7% by weight or less.

7 Claims, 6 Drawing Sheets

(51) Int. Cl.

| | |
|---|---|
| ***B22F 9/08*** | (2006.01) |
| ***C22C 1/04*** | (2023.01) |
| ***H01B 1/22*** | (2006.01) |
| *B22F 1/00* | (2022.01) |

(52) U.S. Cl.
CPC .................. *H01B 1/22* (2013.01); *B22F 1/09* (2022.01); *B22F 2009/0828* (2013.01); *B22F 2009/0832* (2013.01); *B22F 2009/086* (2013.01); *B22F 2201/013* (2013.01); *B22F 2201/02* (2013.01); *B22F 2201/04* (2013.01); *B22F 2201/11* (2013.01); *B22F 2203/13* (2013.01); *B22F 2301/10* (2013.01); *B22F 2303/01* (2013.01); *B22F 2304/10* (2013.01); *B22F 2998/10* (2013.01)

(58) Field of Classification Search
CPC ..... C22C 9/06; C22C 9/08; C22C 9/10; B22F 1/00; B22F 1/05; B22F 1/052; B22F 1/06; B22F 1/062; B22F 1/065; B22F 1/0655; B22F 1/068; B22F 1/07; B22F 1/10; B22F 1/12; B22F 9/06; B22F 9/08; B22F 9/082; B22F 9/10; B22F 2009/0824; B22F 2009/0828; B22F 2009/0832; B22F 2009/0836; B22F 2009/084; B22F 2009/0844; B22F 2009/0848; B22F 2009/0852; B22F 2009/0856; B22F 2009/086; B22F 2009/0864; B22F 2009/0868; B22F 2009/0872; B22F 2009/088; B22F 2009/0884; B22F 2009/0888; B22F 2009/0892; B22F 2009/0896; B22F 2201/01; B22F 2201/013; B22F 2201/016; B22F 2201/02; B22F 2201/04; B22F 2201/05; B22F 2201/10; B22F 2201/11; B22F 2201/12; B22F 2203/13; B22F 2301/10; B22F 2304/10
See application file for complete search history.

(56) References Cited

U.S. PATENT DOCUMENTS

| | | | |
|---|---|---|---|
| 2011/0031448 | A1 | 2/2011 | Ota et al. |
| 2014/0203222 | A1 | 7/2014 | Ito et al. |
| 2015/0136219 | A1 | 5/2015 | Koike et al. |

FOREIGN PATENT DOCUMENTS

| | | | |
|---|---|---|---|
| JP | H11264001 | A | 9/1999 |
| JP | 2004124257 | A | 4/2004 |
| JP | 2005008930 | A | 1/2005 |
| JP | 2008095169 | A | 4/2008 |
| JP | 2012140661 | A | 7/2012 |
| JP | 2016141817 | A | 8/2016 |
| WO | 2010004852 | A1 | 1/2010 |
| WO | 2016157762 | A1 | 10/2016 |

* cited by examiner

COPPER POWDER AND METHOD FOR PRODUCING SAME

CROSS-REFERENCE TO RELATED APPLICATIONS

This application is a continuation application of U.S. patent application Ser. No. 16/473,353, filed Jun. 25, 2019, which is a 371 of PCT/JP2017/045934, filed Dec. 21, 2017.

TECHNICAL FIELD

The present invention relates generally to a copper powder and a method for producing the same. More specifically, the invention relates to a copper powder which can be suitably used as the material of a baked type conductive paste, and a method for producing the same.

BACKGROUND ART

Conventionally, metal powders such as copper powders are used as the materials of baked type conductive pastes for forming contact members of conductor circuits and electrodes.

If a copper powder is used as the material of a baked type conductive paste for forming a contact member of a conductor circuit or electrode on a substrate of a ceramic or a layer of a dielectric, there is a problem in that the difference between the shrinkage rate of the conductive paste and the shrinkage rate of the ceramic substrate or dielectric layer is caused for separating a copper layer from the ceramic substrate or ceramic layer (formed by the sintering of the dielectric) and/or for forming cracks in the copper layer, when the conductive paste is fired for forming the copper layer, since the difference between the sintering temperature of the copper powder and a temperature, at which the shrinkage of the ceramic or the sintering of the dielectric is caused, is too large. For that reason, when a copper powder is used as the material of a baked type conductive paste for forming a contact member of a conductor circuit or electrode on a ceramic substrate or dielectric layer, it is desired to decrease the difference between the shrinkage rate of the conductive paste and the shrinkage rate of the ceramic substrate or dielectric layer when the conductive paste is fired for forming a copper layer. In order to thus decrease the difference between the shrinkage rate of the conductive paste and the shrinkage rate of the ceramic substrate or dielectric layer, it is desired to use a copper powder, which has a high shrinkage starting temperature during heating, as the material of the conductive paste.

As a method for producing a metal powder which is to be used as the material of a conductive paste, there is proposed a method for producing a metal powder such as a copper powder by water atomizing method at a water jet pressure of higher than 60 MPa and not higher than 180 MPa, a water jet flow rate of 80 to 190 L/min. and a water jet vertical angle of 10 to 30° (see, e.g., Patent Document 1). There is also proposed a method for producing spherical fine metal copper particles having a BET diameter of 3 μm or less and a crystalline diameter of 0.1 to 10 μm by spraying gas containing ammonia onto a molten metal of copper (see, e.g., Patent Document 2).

PRIOR ART DOCUMENT(S)

Patent Document(s)

Patent Document 1: Japanese Patent Laid-Open No. 2016-141817 (Paragraph Number 0009)

Patent Document 2: Japanese Patent Laid-Open No. 2004-124257 (Paragraph Numbers 0014-0017)

SUMMARY OF THE INVENTION

Problem to be Solved by the Invention

However, when a copper powder produced by the method of Patent Document 1 is used as the material of a baked type conductive paste, if the particle diameter of the copper powder is decreased in order to form a thin copper layer, the content of oxygen therein is easily increased. For that reason, the shrinkage starting temperature during heating is easily lowered, so that the difference between the shrinkage rate of the conductive paste and the shrinkage rate of the ceramic substrate or dielectric layer is easily increased. In the method of Patent Document 2, gas containing ammonia is sprayed onto the surface of the molten metal of copper from a nozzle, which is provided on an upper portion, to generate fine particles which are collected by a filter to produce spherical fine metal copper particles. For that reason, in comparison with a typical atomizing method, the rate for producing the fine metal copper particles is slower, and the yield thereof is lower. In addition, the number of the contact points of the fine metal copper particles to each other is smaller than that in other shapes to easily lower the conductivity thereof. Moreover, it is required to spray gas containing ammonia onto the molten metal of copper, so that the producing costs thereof are increased.

It is therefore an object of the present invention to eliminate the aforementioned conventional problems and to provide an inexpensive copper powder which has a low content of oxygen even if it has a small particle diameter and which has a high shrinkage starting temperature when it is heated, and a method for producing the same.

Means for Solving the Problem

In order to accomplish the aforementioned object, the inventors have diligently studied and found that it is possible to produce an inexpensive copper powder which has a low content of oxygen even if it has a small particle diameter and which has a high shrinkage starting temperature when it is heated, if a molten metal of copper heated to a temperature, which is higher than the melting point of copper by 250 to 700° C., is rapidly cooled and solidified by spraying a high-pressure water onto the molten metal in a non-oxidizing atmosphere while the molten metal is allowed to drop. Thus, the inventors have made the present invention.

According to the present invention, there is provided a method for producing a copper powder, the method comprising the steps of: heating a molten metal of copper to a temperature which is higher than the melting point of copper by 250 to 700° C.; and rapidly cooling and solidifying the heated molten metal by spraying a high-pressure water onto the heated molten metal in a non-oxidizing atmosphere while the heated molten metal is allowed to drop.

In this method for producing a copper powder, the heating of the molten metal is preferably carried out in a non-oxidizing atmosphere. The high-pressure water is preferably pure water or alkaline water. The high-pressure water is preferably sprayed onto the heated molten metal at a water pressure of 60 to 180 MPa.

According to the present invention, there is provided a copper powder which has an average particle diameter of 1 to 10 μm and a crystallite diameter $Dx_{(200)}$ of not less than 40 nm on (200) plane thereof, the content of oxygen in the copper powder being 0.7% by weight or less.

The circularity coefficient of this copper powder is preferably 0.80 to 0.94. The ratio of the content of oxygen to a BET specific surface area of the copper powder is preferably 2.0 wt %·g/m$^2$ or less. The crystallite diameter $Dx_{(111)}$ on (111) plane of the copper powder is preferably not less than 130 nm. The temperature at a shrinkage percentage of 1.0% in a thermomechanical analysis of the copper powder is preferably a temperature of not lower than 580° C.

According to the present invention, there is provided a conductive paste wherein the above-described copper powder is dispersed in an organic component. This conductive paste is preferably a baked type conductive paste.

According to the present invention, there is provided a method for producing a conductive film, the method comprising the steps of: applying the above-described baked type conductive paste on a substrate; and thereafter, firing the paste to produce a conductive film.

Throughout the specification, the expression "average particle diameter" means a volume-based particle diameter ($D_{50}$ diameter) corresponding to 50% of accumulation in cumulative distribution, which is measured by means of a laser diffraction particle size analyzer (by HELOS method).

Effects of the Invention

According to the present invention, it is possible to produce an inexpensive copper powder which has a low content of oxygen even if it has a small particle diameter and which has a high shrinkage starting temperature when it is heated.

MODE FOR CARRYING OUT THE INVENTION

Figure 1:
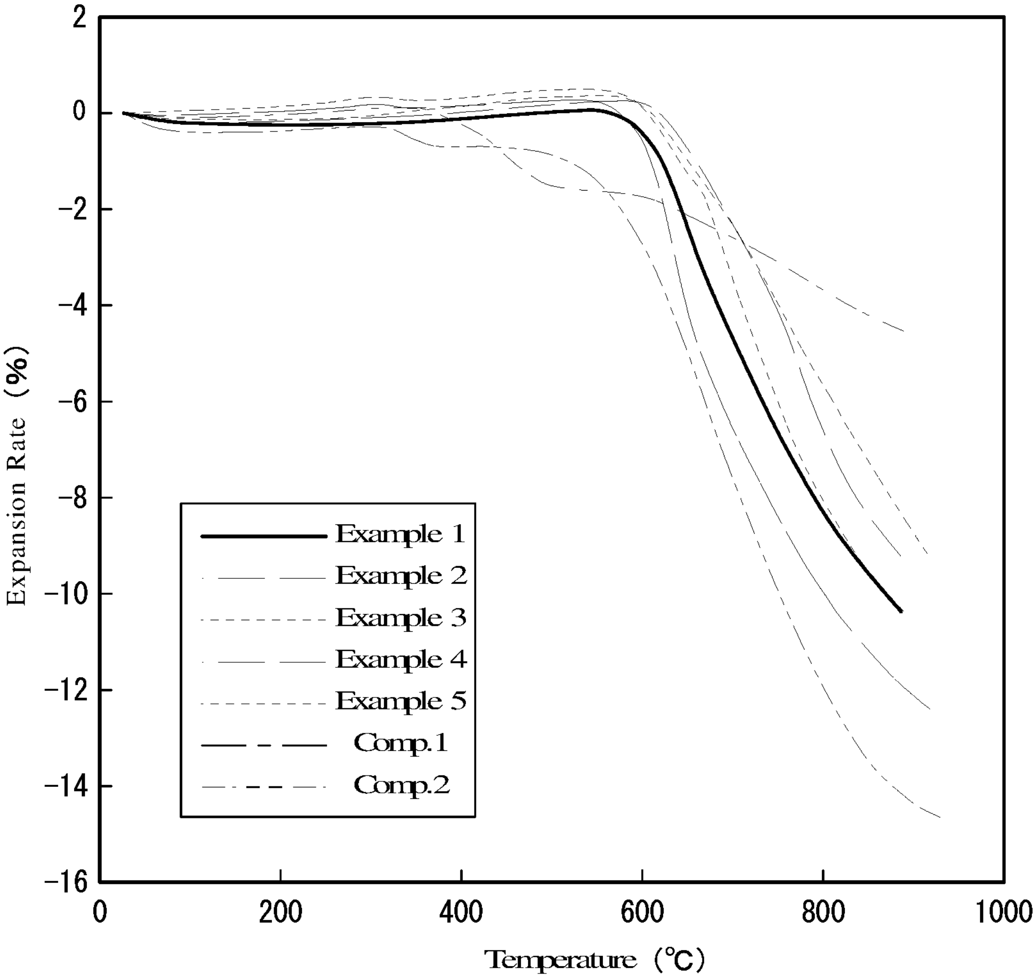
FIG. 1 is a graph showing a shrinking percentage of each of copper powders in Examples and Comparative Examples with respect to temperature in a thermomechanical analysis (TMA)
Figure 2:
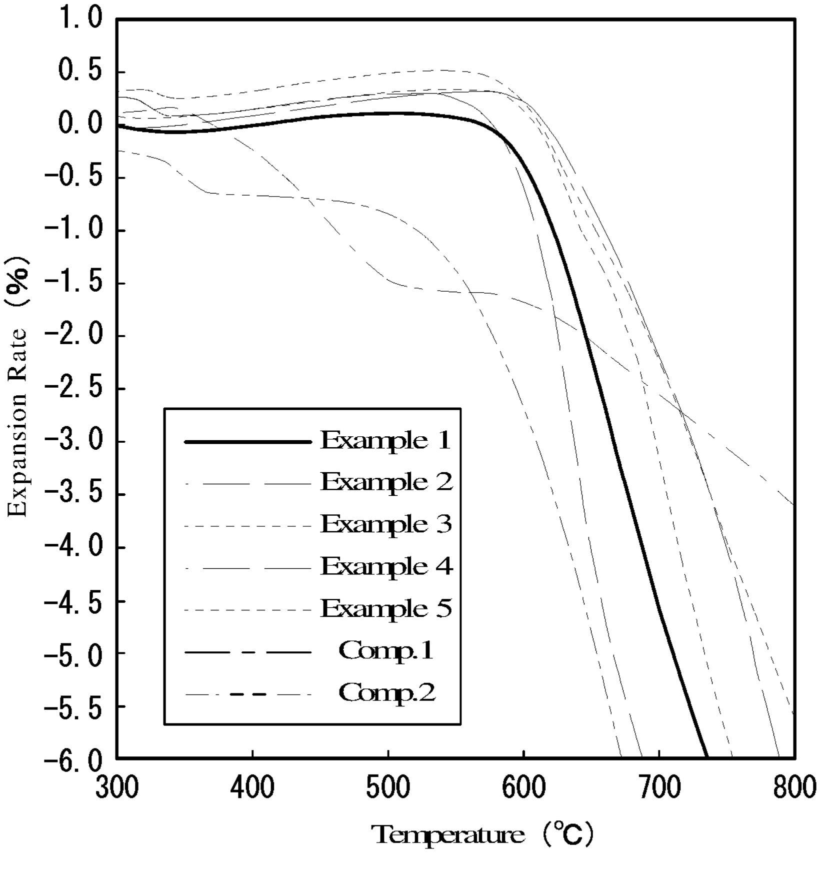
FIG. 2 is an enlarged graph showing a part of FIG. 1.
Figure 3:
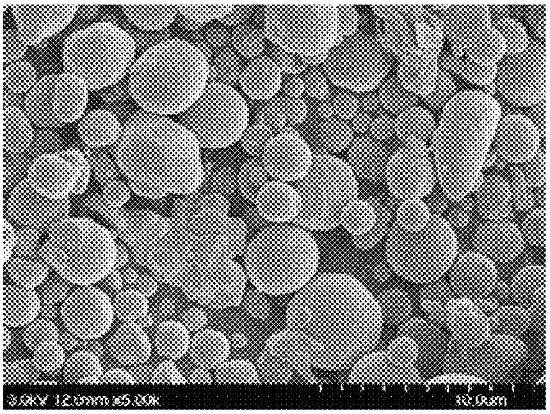
FIG. 3 is an electron micrograph of a copper powder in Example 1.
Figure 4:
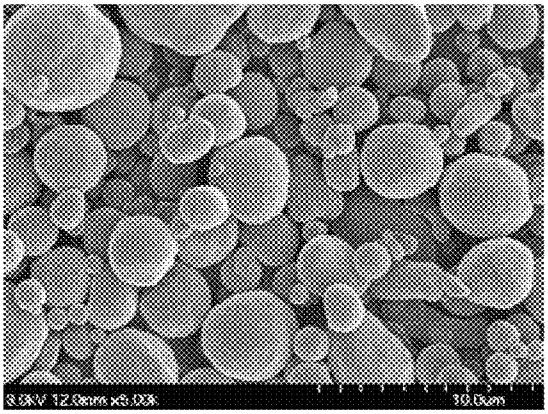
FIG. 4 is an electron micrograph of a copper powder in Example 2.
Figure 5:
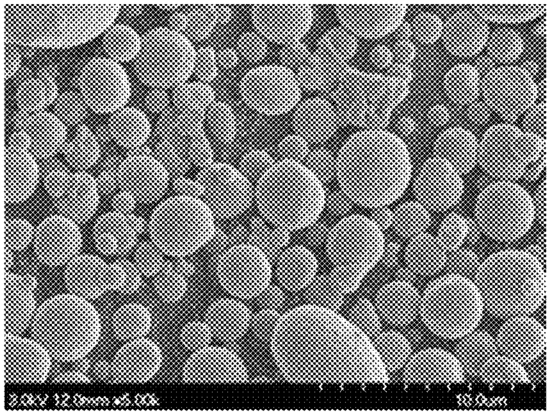
FIG. 5 is an electron micrograph of a copper powder in Example 3.
Figure 6:
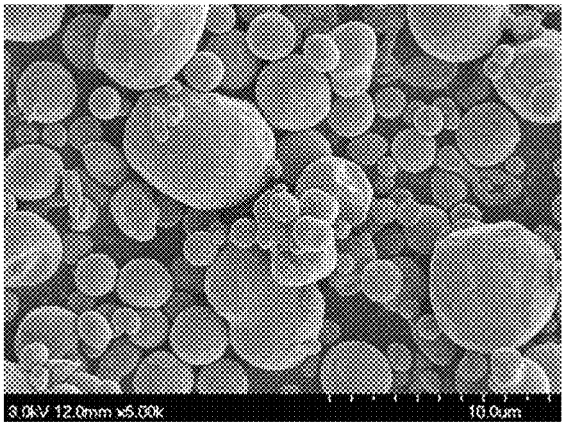
FIG. 6 is an electron micrograph of a copper powder in Example 4.
Figure 7:
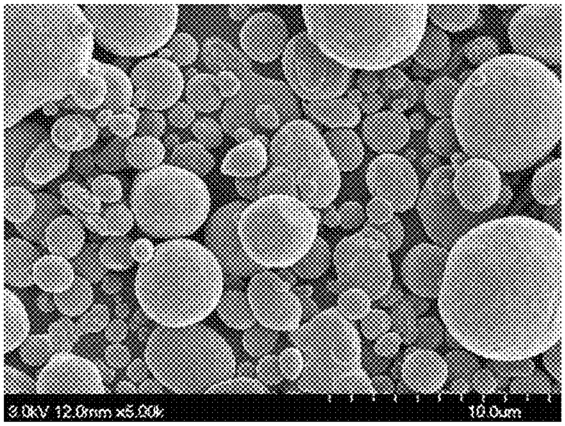
FIG. 7 is an electron micrograph of a copper powder in Example 5.
Figure 8:
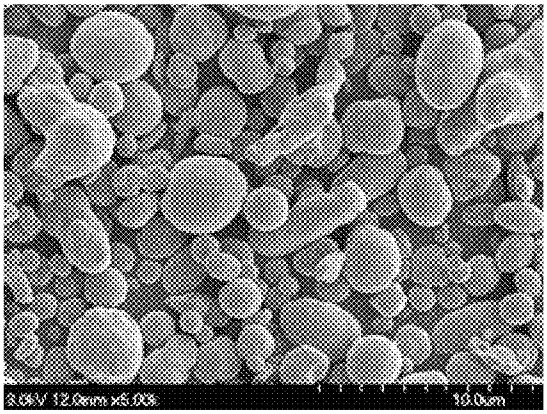
FIG. 8 is an electron micrograph of a copper powder in Comparative Example 1.
Figure 9:
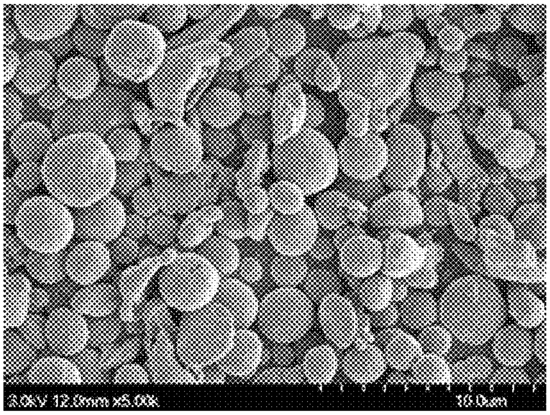
FIG. 9 is an electron micrograph of a copper powder in Comparative Example 2.

In the preferred embodiment of a method for producing a copper powder according to the present invention, while a molten metal of copper heated to a temperature, which is higher than the melting point of copper by 250 to 700° C. (preferably 350 to 700° C. and more preferably 450 to 700° C., is allowed to drop, a high-pressure water is sprayed onto the heated molten metal of copper in a non-oxidizing atmosphere (such as an atmosphere of nitrogen, argon, hydrogen or carbon monoxide) to rapidly cool and solidify the heated molten metal of copper. If a so-called water atomizing method, in which a high-pressure water is sprayed, is carried out for producing a copper powder, it is possible to cause the produced copper powder to have a small particle diameter. Furthermore, in a so-called gas atomizing method, it is difficult to obtain a copper powder having a small particle diameter (with a sufficient yield) since the powdering power therein is smaller than that in the water atomizing method. In addition, since copper is easily oxidized, if copper is atomized in an atmosphere containing oxygen, there are problems in that the content of oxygen in a copper powder produced by the water atomizing method is easily increased, that the conductivity of the copper powder is easily lowered and that the shrinkage starting temperature of the copper powder is easily lowered when it is heated. However, if a high-pressure water is sprayed in a non-oxidizing atmosphere (such as an atmosphere of nitrogen, argon, hydrogen or carbon monoxide) to produce a copper powder, it is possible to decrease the content of oxygen in the copper powder. Moreover, if there is used a molten metal of copper heated to a temperature which is higher than the melting point of copper by 250 to 700° C., it is possible to increase the crystallite diameter of the copper powder, and it is possible to raise the shrinkage starting temperature of the copper powder when it is heated.

In this method for producing a copper powder, the heating of the molten metal of is preferably carried out in a non-oxidizing atmosphere (such as an atmosphere of nitrogen, argon, hydrogen or carbon monoxide). If copper is melted in a non-oxidizing atmosphere (such as an atmosphere of nitrogen, argon, hydrogen or carbon monoxide) to produce a copper powder by the water atomizing method, it is possible to decrease the content of oxygen in the copper powder. In order to decrease the content of oxygen in the copper powder, a reducing agent, such as carbon black or charcoal, may be added to the molten metal.

In order to prevent copper from corroding, the high-pressure water is preferably pure water or alkaline water, and more preferably alkaline water having a pH of 8 to 12. The water pressure of the high-pressure water sprayed onto the molten metal is preferably high (in order to produce a copper powder having a small particle diameter). The water pressure is preferably 60 to 180 MPa, more preferably 80 to 180 MPa and most preferably 90 to 180 MPa.

The solid-liquid separation of a slurry obtained by rapidly cooling and solidifying the molten metal by thus spraying the high-pressure water onto the molten metal can be carried out to obtain a solid body which is dried to obtain a copper powder. Furthermore, if necessary, the solid body obtained by the solid-liquid separation may be washed with water before it is dried, and the solid body may be pulverized and/or classified to adjust the grain size thereof after it is dried.

By this preferred embodiment of a method for producing a copper powder according to the present invention, the preferred embodiment of a copper powder according to the present invention can be produced at low costs in a short period of time.

The preferred embodiment of a copper powder according to the present invention has an average particle diameter of 1 to 10 μm and a crystallite diameter $Dx_{(200)}$ of not less than 40 nm on (200) plane thereof, the content of oxygen in the copper powder being 0.7% by weight or less. The copper powder thus having a small average particle diameter, a large crystallite diameter and a small content of oxygen has a high shrinkage starting temperature when it is heated. Furthermore, the copper powder may contain a very small amount of iron, nickel, sodium, potassium, calcium, carbon, nitrogen, phosphorus, silicon, chlorine and so forth in addition to oxygen as unavoidable impurities.

The average particle diameter of the copper powder is 1 to 10 μm, preferably 1.2 to 7 μm and more preferably 1.5 to 5.5 μm. When the copper powder is used as the material of a conductive paste, the average particle diameter of the copper powder is preferably small so that it is possible to form a thin layer of copper. The shape of the copper powder is not so round that it is a true sphere (although the copper powder is round if it is produced by the water atomizing method).

The circularity coefficient of the copper powder is preferably 0.80 to 0.94 and more preferably 0.88 to 0.93. If the copper powder has such a circularity coefficient, the number of the contact points of the copper particles to each other is increased in comparison with the true sphere, so that the conductivity of the copper powder can be good. Furthermore, in a so-called gas atomizing method, the cooling and solidifying of the molten metal is gently and quietly carried out by atomizing in comparison with the water atomizing method. For that reason, the obtained copper powder has a very high circularity near a true sphere, so that it is difficult to obtain a copper powder having a desired circularity (preferably a circularity coefficient of 0.80 to 0.94).

The BET specific surface area of the copper powder is preferably 0.1 to 3 $m^2/g$ and more preferably 0.2 to 2.5 $m^2/g$. The content of oxygen in the copper powder is 0.7% by weight or less, preferably 0.4% by weight or less, and more preferably 0.2% by weight or less. If the content of oxygen in the copper powder is thus decreased, it is possible to raise the shrinkage starting temperature of the copper powder when it is heated, and it is possible to improve the conductivity of the copper powder. The ratio of the content of oxygen to the BET specific surface area of the copper powder is preferably 2.0 wt $\%\cdot g/m^2$ or less, and more preferably 0.2 to 0.8 wt $\%\cdot g/m^2$. The tap density of the copper powder is preferably 2 to 7 $g/cm^3$, and more preferably 3 to 6 $g/cm^3$. The content of carbon in the copper powder is preferably 0.5% by weight or less, and more preferably 0.2% by weight or less. If the content of carbon in the copper powder is low, when the copper powder is used as the material of a baked type conductive paste, it is possible to suppress the generation of gas during the firing of the conductive paste, so that it is possible to suppress the lowering of the adhesion of a conductive film to a substrate and to suppress the formation of cracks in the conductive film.

The crystallite diameter of $Dx_{(200)}$ on (200) plane of the copper powder is not less than 40 nm, preferably 42 to 90 nm and more preferably 45 to 85 nm. The crystallite diameter $Dx_{(111)}$ on (111) plane of the copper powder is preferably not less than 130 nm, and more preferably 133 to 250 nm. The crystallite diameter $Dx_{(220)}$ on (220) plane of the copper powder is preferably not less than 40 nm, and more preferably 40 to 70 nm. If the crystallite diameter Dx is thus increased, it is possible to raise the shrinkage starting temperature of the copper powder when it is heated.

The temperature at a shrinkage percentage of 1.0% in a thermomechanical analysis of the copper powder is preferably a temperature of not lower than 580° C., and more preferably a temperature of 610 to 700° C. The temperature at a shrinkage percentage of 0.5% in a thermomechanical analysis of the copper powder is preferably a temperature of not lower than 500° C., and more preferably a temperature of 600 to 700° C. The temperature at a shrinkage percentage of 1.5% in a thermomechanical analysis of the copper powder is preferably a temperature of not lower than 590° C., and more preferably a temperature of 620 to 700° C. The temperature at a shrinkage percentage of 6.0% in a thermomechanical analysis of the copper powder is preferably a temperature of not lower than 680° C., and more preferably a temperature of 700 to 850° C.

The preferred embodiment of a copper powder according to the present invention can be used as the material of a conductive paste (which contains the copper powder dispersed in an organic component) or the like. In particular, the preferred embodiment of a copper powder according to the present invention is preferably used as the material of a baked type conductive paste (which is preferably fired at a high temperature of about 600 to 1000° C.) having a high firing temperature since it has a high shrinkage starting temperature. Furthermore, the shape of the preferred embodiment of a copper powder according to the present invention is not round like a true sphere (the circularity coefficient of the copper powder being 0.80 to 0.94). For that reason, when the copper powder is used as the material of a baked type conductive paste, the number of the contact points of the copper particles to each other is larger than that of the true sphere, so that it is possible to form a conductive film having good conductivity. The preferred embodiment of a copper powder according to the present invention may be mixed with another metal powder having a different shape and particle diameter to be used as the material of a conductive paste.

When the preferred embodiment of a copper powder according to the present invention is used as the material of a conductive paste (such as a baked type conductive paste), the conductive paste contains the copper powder and an organic solvent (such as saturated aliphatic hydrocarbons, unsaturated aliphatic hydrocarbons, ketones, aromatic hydrocarbons, glycol ethers, esters, and alcohols) as the components thereof. If necessary, the conductive paste may contain vehicles, which contain a binder resin (such as ethyl cellulose or acrylic resin) dissolved in an organic solvent, glass frits, inorganic oxides, dispersing agents, and so forth.

The content of the copper powder in the conductive paste is preferably 5 to 98% by weight and more preferably 70 to 95% by weight, from the points of view of the conductivity and producing costs of the conductive paste. The copper powder in the conductive paste may be mixed with one or more of other metal powders (such as silver powder, an alloy powder of silver and tin, and tin powder) to be used. The metal powder(s) may have different shapes and particle diameters from those of the preferred embodiment of a copper powder according to the present invention. The average particle diameter of the metal powder(s) is preferably 0.5 to 20 μm in order to form a thin conductive film. The content of the metal powder(s) in the conductive paste is preferably 1 to 94% by weight and more preferably 4 to 29% by weight. Furthermore, the total of the contents of the copper powder and the metal powder(s) in the conductive paste is preferably 60 to 99% by weight. The content of the binder resin in the conductive paste is preferably 0.1 to 10% by weight and more preferably 0.1 to 6% by weight, from the points of view of the dispersibility of the copper powder in the conductive paste and of the conductivity of the conductive paste. Two or more of the vehicles containing the binder resin dissolved in the organic solvent may be mixed to be used. The content of the glass frit in the conductive paste is preferably 0.1 to 20% by weight and more preferably 0.1 to 10% by weight, from the points of view of the sinterability of the conductive paste. Two or more of the glass frits may be mixed to be used. The content of the organic solvent in the conductive paste (the content containing the organic solvent of the vehicle when the conductive paste contains the vehicle) is preferably 0.8 to 20% by weight and more preferably 0.8 to 15% by weight, in view of the dispersibility of the copper powder in the conductive paste and of the reasonable viscosity of the conductive paste. Two or more of the organic solvents may be mixed to be used.

For example, such a conductive paste can be prepared by putting components, the weights of which are measured, in a predetermined vessel to preliminarily knead the components by means of a Raikai mixer (grinder), an all-purpose mixer, a kneader or the like, and thereafter, kneading them by means of a three-roll mill. Thereafter, an organic solvent may be added thereto to adjust the viscosity thereof, if necessary. After only the glass frit, inorganic oxide and vehicle may be kneaded to decrease the grain size thereof, the copper powder may be finally added to be kneaded.

If this conductive paste is fired after it is applied on a substrate (such as a ceramic substrate or dielectric layer) so as to have a predetermined pattern shape by dipping or printing (such as metal mask printing, screen printing, or ink-jet printing), a conductive film can be formed. When the conductive paste is applied by dipping, a substrate is dipped into the conductive paste to form a coating film, and then, unnecessary portions of the coating film are removed by photolithography utilizing a resist or the like, so that it is possible to form a coating film having a predetermined pattern shape on the substrate.

The firing of the conductive paste applied on the substrate may be carried out in the atmosphere or in a non-oxidizing atmosphere (such as an atmosphere of nitrogen, argon, hydrogen or carbon monoxide). The firing temperature of the conductive paste is preferably about 600 to 1000 V, and more preferably about 700 to 900° C. Before the firing of the conductive paste, volatile constituents, such as organic solvents, in the conductive paste may be removed by pre-drying by vacuum drying or the like.

EXAMPLES

Examples of a copper powder and a method for producing the same according to the present invention will be described below in detail.

Example 1

While a molten metal melted by heating balls of oxygen-free copper to 1600° C. in an atmosphere of nitrogen was allowed to drop from the lower portion of a tundish in an atmosphere of nitrogen, a high-pressure water (alkaline water having a pH of 10.3) was sprayed onto the heated molten metal at a water pressure of 101 MPa and a water flow rate of 161 L/min. to rapidly cool and solidify the heated molten metal to obtain a slurry. The solid-liquid separation of the slurry thus obtained was carried out to obtain a solid body. The solid body thus obtained was washed with water, dried, pulverized and air-classified to obtain a copper powder.

With respect to the copper powder thus obtained, the BET specific surface area, tap density, oxygen content, carbon content and particle size distribution thereof were obtained.

The BET specific surface area was measured by means of a BET specific surface area measuring apparatus (4-Sorb US produced by Yuasa Ionics Co., Ltd.) using the single point BET method while a mixed gas of nitrogen and helium ($N_2$: 30% by volume, He: 70% by volume) was caused to flow in the apparatus after nitrogen gas was caused to flow in the apparatus at 105° C. for 20 minutes to deaerate the interior of the apparatus. As a result, the BET specific surface area was 0.30 $m^2/g$.

The tap density (TAP) was obtained by the same method as that disclosed in Japanese Laid-Open No. 2007-263860 as follows. First, 80% of a volume of a closed-end cylindrical die having an inside diameter of 6 mm and a height of 11.9 mm was filled with the copper powder to form a copper powder layer. Then, a pressure of 0.160 $N/m^2$ was uniformly applied on the top face of the copper powder layer to pressurize the copper powder layer until the die is not densely filled with the copper powder any more, and thereafter, the height of the copper powder layer was measured. Then, the density of the copper powder was obtained from the measured height of the copper powder layer and the weight of the filled copper powder. The density of the copper powder thus obtained was assumed as the tap density of the copper powder. As a result, the tap density was 4.8 $g/cm^3$.

The oxygen content was measured by means of an oxygen/nitrogen/hydrogen analyzer (EMGA-920 produced by HORIBA, Ltd.). As a result, the oxygen content was 0.12% by weight. The ratio (O/BET) of the oxygen content to the BET specific surface area of the copper powder was calculated. As a result, the ratio (O/BET) was 0.39 wt $\%\cdot g/m^2$.

The carbon content was measured by means of a carbon/sulfur analyzer (EMIA-220V produced by HORIBA, Ltd.). As a result, the carbon content was 0.004% by weight.

The particle size distribution was measured at a dispersing pressure of 5 bar by means of a laser diffraction particle size analyzer (HELOS particle size analyzer produced by SYMPATEC GmbH (HELOS & RODOS (dry dispersion in the free aerosol jet))). As a result, the particle diameter ($D_{10}$) corresponding to 10% of accumulation in cumulative distribution of the copper powder was 1.3 μm, the particle diameter ($D_{50}$) corresponding to 50% of accumulation in cumulative distribution of the copper powder was 3.7 μm, and the particle diameter ($D_{90}$) corresponding to 90% of accumulation in cumulative distribution of the copper powder was 8.2 μm.

The X-ray diffraction (XRD) measurement of the obtained copper powder was carried out in a measured range of 48 to 92°/2θ using a Co tube as an X-ray source by means of an X-ray diffractometer (RINT-2100 produced by Rigaku Co., Ltd.). From a X-ray diffraction pattern obtained by the X-ray diffraction measurement, the crystallite diameter (Dx) of the copper powder was obtained by the Scherrer equation ($Dhkl=\kappa\lambda/\beta \cos \kappa$). In this equation, Dhkl denotes a crystallite diameter (angstrom) (the size of a crystallite in a direction perpendicular to hkl), and λ denotes the wavelength (angstrom) of measuring X-rays (1.78892 angstroms when a Co target is used), β denoting the broadening (rad) (expressed by a half-power band width) of diffracted rays based on the size of the crystallite, θ denoting a Bragg angle (rad) of the angle of diffraction (which is an angle when the angle of incidence is equal to the angle of reflection and which uses the angle at a peak top) and K denoting the Scherrer constant (which varies in accordance with the definition of D and β and which is assumed as K=0.9). Furthermore, the peak data of each plane of the (111) plane, (200) plane and (220) plane were used for carrying out calculation. As a result, the crystallite diameter ($D_x$) of the copper powder was 200.7 nm on (111) plane, 68.5 nm on (200) plane and 59.0 nm on (220) plane.

The circularity coefficient of each of 100 copper particles optionally selected in a field of vision of an electron micrograph (magnification of 5000) of the copper powder was obtained, and an average value thereof was calculated. As a result, the average value of the circularity coefficients was 0.90. Furthermore, the circularity coefficient is a parameter indicating how much the shape of a particle separates from a circle. The circularity coefficient is defined by the equation "circularity coefficient=$(4\pi S)/(L^2)$" (in this equation, S denotes the area of a particle and L denotes a length of circumference of the particle). When the shape of the particle is a circle, the circularity coefficient is 1. As the shape of the particle separates from the circle, the circularity coefficient decreases from 1.

The thermomechanical analysis (TMA) of the copper powder was carried out as follows. First, the copper powder was put in an alumina pan having a diameter of 5 mm and a height of 3 mm to be set on a sample holder (cylinder) of a thermomechanical analyzer (TMA) (TMA/SS6200 produced by Seiko Instruments Inc.). Then, a measuring probe was used for applying a load of 0.147 N on the copper powder for one minute to press and harden the powder to prepare a test sample. Then, while nitrogen was caused to flow at a flow rate of 200 mL/min. in the analyzer, a measuring load of 980 mN was applied on the test sample, and the temperature of the test sample was raised at a rate of temperature increase of 10° C./min. from a room temperature to 900° C. to measure the shrinking percentage of the test sample (the shrinking percentage with respect to the length of the test sample at the room temperature). As a result, the temperature of the test sample was 606° C. at a shrinking percentage of 0.5% (expansion rate=−0.5%), 622° C. at a shrinking percentage of 1.0% (expansion rate=−1.0%), 634° C. at a shrinking percentage of 1.5% (expansion rate=−1.5%), and 735° C. at a shrinking percentage of 6.0% (expansion rate=−6.0%).

Example 2

A copper powder was obtained by the same method as that in Example 1, except that the water pressure was 106 MPa and the water flow rate was 165 L/min. With respect to the copper powder thus obtained, the BET specific surface area, tap density, oxygen content, carbon content, particle size distribution, crystalline diameter (Dx) and average value of circularity coefficients thereof were obtained by the same methods as those in Example 1, and the thermomechanical analysis (TMA) of the copper powder was carried out by the same method as that in Example 1.

As a result, the BET specific surface area of the copper powder was 0.28 $m^2/g$, and the tap density thereof was 4.9 $g/cm^3$. The oxygen content in the copper powder was 0.12% by weight, and the ratio (O/BET) of the oxygen content to the BET specific surface area of the copper powder was 0.43 wt %·$g/m^2$. The carbon content in the copper powder was 0.004% by weight. The particle diameter ($D_{10}$) corresponding to 10% of accumulation in cumulative distribution of the copper powder was 1.4 μm, the particle diameter ($D_{50}$) corresponding to 50% of accumulation in cumulative distribution of the copper powder was 3.8 μm, and the particle diameter ($D_{90}$) corresponding to 90% of accumulation in cumulative distribution of the copper powder was 7.9 μm. The crystallite diameter ($D_x$) of the copper powder was 136.9 nm on (111) plane, 47.2 nm on (200) plane and 44.8 nm on (220) plane. The average value of the circularity coefficients was 0.92. In the thermomechanical analysis (TMA), the temperature of the test sample was 640° C. at a shrinking percentage of 0.5% (expansion rate=−0.5%), 659° C. at a shrinking percentage of 1.0% (expansion rate=−1.0%), 677° C. at a shrinking percentage of 1.5% (expansion rate=−1.5%), and 788° C. at a shrinking percentage of 6.0% (expansion rate=−6.0%).

Example 3

A copper powder was obtained by the same method as that in Example 1, except that the water pressure was 105 MPa and the water flow rate was 163 L/min. With respect to the copper powder thus obtained, the BET specific surface area, tap density, oxygen content, carbon content, particle size distribution, crystalline diameter (Dx) and average value of circularity coefficients thereof were obtained by the same methods as those in Example 1, and the thermomechanical analysis (TMA) of the copper powder was carried out by the same method as that in Example 1.

As a result, the BET specific surface area of the copper powder was 0.31 $m^2/g$, and the tap density thereof was 4.8 $g/cm^3$. The oxygen content in the copper powder was 0.12% by weight, and the ratio (O/BET) of the oxygen content to the BET specific surface area of the copper powder was 0.38 wt %·$g/m^2$. The carbon content in the copper powder was 0.007% by weight. The particle diameter ($D_{10}$) corresponding to 10% of accumulation in cumulative distribution of the copper powder was 1.4 μm, the particle diameter ($D_{50}$) corresponding to 50% of accumulation in cumulative distribution of the copper powder was 3.7 μm, and the particle diameter ($D_{90}$) corresponding to 90% of accumulation in cumulative distribution of the copper powder was 6.8 μm. The crystallite diameter ($D_x$) of the copper powder was 140.1 nm on (111) plane, 50.2 nm on (200) plane and 46.2 nm on (220) plane. The average value of the circularity coefficients was 0.92. In the thermomechanical analysis (TMA), the temperature of the test sample was 627° C. at a shrinking percentage of 0.5% (expansion rate=−0.5%), 642° C. at a shrinking percentage of 1.0% (expansion rate=−1.0%), 663° C. at a shrinking percentage of 1.5% (expansion rate=−1.5%), and 753° C. at a shrinking percentage of 6.0% (expansion rate=−6.0%).

Example 4

A copper powder was obtained by the same method as that in Example 1, except that a molten metal melted by heating balls of oxygen-free copper to 1500° C. was used and that the water pressure was 111 MPa and the water flow rate was 165 L/min. With respect to the copper powder thus obtained, the BET specific surface area, tap density, oxygen content, carbon content, particle size distribution, crystalline diameter (Dx) and average value of circularity coefficients thereof were obtained by the same methods as those in Example 1, and the thermomechanical analysis (TMA) of the copper powder was carried out by the same method as that in Example 1.

As a result, the BET specific surface area of the copper powder was 0.32 $m^2/g$, and the tap density thereof was 4.8 $g/cm^3$. The oxygen content in the copper powder was 0.13% by weight, and the ratio (O/BET) of the oxygen content to the BET specific surface area of the copper powder was 0.41 wt %·$g/m^2$. The carbon content in the copper powder was 0.005% by weight. The particle diameter ($D_{10}$) corresponding to 10% of accumulation in cumulative distribution of the copper powder was 1.3 μm, the particle diameter ($D_{50}$) corresponding to 50% of accumulation in cumulative distribution of the copper powder was 3.5 μm, and the particle diameter ($D_{90}$) corresponding to 90% of accumulation in cumulative distribution of the copper powder was 7.0 μm.

The crystallite diameter ($D_x$) of the copper powder was 129.0 nm on (111) plane, 59.3 nm on (200) plane and 61.9 nm on (220) plane. The average value of the circularity coefficients was 0.92. In the thermomechanical analysis (TMA), the temperature of the test sample was 597° C. at a shrinking percentage of 0.5% (expansion rate=−0.5%), 608° C. at a shrinking percentage of 1.0% (expansion rate=−1.0%), 617° C. at a shrinking percentage of 1.5% (expansion rate=−1.5%), and 687° C. at a shrinking percentage of 6.0% (expansion rate=−6.0%).

Example 5

A copper powder was obtained by the same method as that in Example 1, except that a molten metal melted by heating balls of oxygen-free copper to 1617° C. in the atmosphere was used and that the water pressure was 104 MPa and the water flow rate was 166 L/min. With respect to the copper powder thus obtained, the BET specific surface area, tap density, oxygen content, carbon content, particle size distribution, crystalline diameter (Dx) and average value of circularity coefficients thereof were obtained by the same methods as those in Example 1, and the thermomechanical analysis (TMA) of the copper powder was carried out by the same method as that in Example 1.

As a result, the BET specific surface area of the copper powder was 0.33 $m^2/g$, and the tap density thereof was 4.9 $g/cm^3$. The oxygen content in the copper powder was 0.15% by weight, and the ratio (O/BET) of the oxygen content to the BET specific surface area of the copper powder was 0.46 wt %·$g/m^2$. The carbon content in the copper powder was 0.007% by weight. The particle diameter ($D_{10}$) corresponding to 10% of accumulation in cumulative distribution of the copper powder was 1.3 μm, the particle diameter ($D_{50}$) corresponding to 50% of accumulation in cumulative distribution of the copper powder was 3.7 μm, and the particle diameter ($D_{90}$) corresponding to 90% of accumulation in cumulative distribution of the copper powder was 8.0 μm. The crystallite diameter ($D_x$) of the copper powder was 160.3 nm on (111) plane, 65.8 nm on (200) plane and 66.7 nm on (220) plane. The average value of the circularity coefficients was 0.90. In the thermomechanical analysis (TMA), the temperature of the test sample was 632° C. at a shrinking percentage of 0.5% (expansion rate=−0.5%), 652° C. at a shrinking percentage of 1.0% (expansion rate=−1.0%), 673° C. at a shrinking percentage of 1.5% (expansion rate=−1.5%), and 811° C. at a shrinking percentage of 6.0% (expansion rate=−6.0%).

Comparative Example 1

A copper powder was obtained by the same method as that in Example 1, except that a molten metal melted by heating balls of oxygen-free copper to 1200° C. was used and that the water pressure was 100 MPa and the water flow rate was 160 L/min. With respect to the copper powder thus obtained, the BET specific surface area, tap density, oxygen content, carbon content, particle size distribution, crystalline diameter (Dx) and average value of circularity coefficients thereof were obtained by the same methods as those in Example 1, and the thermomechanical analysis (TMA) of the copper powder was carried out by the same method as that in Example 1.

As a result, the BET specific surface area of the copper powder was 0.34 $m^2/g$, and the tap density thereof was 4.6 $g/cm^3$. The oxygen content in the copper powder was 0.14% by weight, and the ratio (O/BET) of the oxygen content to the BET specific surface area of the copper powder was 0.41 wt %·$g/m^2$. The carbon content in the copper powder was 0.007% by weight. The particle diameter ($D_{10}$) corresponding to 10% of accumulation in cumulative distribution of the copper powder was 1.3 μm, the particle diameter ($D_{50}$) corresponding to 50% of accumulation in cumulative distribution of the copper powder was 3.5 μm, and the particle diameter ($D_{90}$) corresponding to 90% of accumulation in cumulative distribution of the copper powder was 6.3 μm. The crystallite diameter ($D_x$) of the copper powder was 108.3 nm on (111) plane, 39.9 nm on (200) plane and 37.0 nm on (220) plane. The average value of the circularity coefficients was 0.89. In the thermomechanical analysis (TMA), the temperature of the test sample was 425° C. at a shrinking percentage of 0.5% (expansion rate=−0.5%), 461° C. at a shrinking percentage of 1.0% (expansion rate=−1.0%), and 507° C. at a shrinking percentage of 1.5% (expansion rate=−1.5%).

Comparative Example 2

While a molten metal melted by heating balls of oxygen-free copper to 1600° C. in an atmosphere of nitrogen was allowed to drop from the lower portion of a tundish in the atmosphere, a high-pressure water (alkaline water having a pH of 10.2) was sprayed onto the heated molten metal at a water pressure of 117 MPa and a water flow rate of 166 L/min. to rapidly cool and solidify the heated molten metal to obtain a slurry. The solid-liquid separation of the slurry thus obtained was carried out to obtain a solid body. The solid body thus obtained was washed with water, dried, pulverized and air-classified to obtain a copper powder.

With respect to the copper powder thus obtained, the BET specific surface area, tap density, oxygen content, carbon content, particle size distribution, crystalline diameter (Dx) and average value of circularity coefficients thereof were obtained by the same methods as those in Example 1, and the thermomechanical analysis (TMA) of the copper powder was carried out by the same method as that in Example 1.

As a result, the BET specific surface area of the copper powder was 0.37 $m^2/g$, and the tap density thereof was 4.5 $g/cm^3$. The oxygen content in the copper powder was 0.76% by weight, and the ratio (O/BET) of the oxygen content to the BET specific surface area of the copper powder was 2.04 wt %·$g/m^2$. The carbon content in the copper powder was 0.006% by weight. The particle diameter ($D_{10}$) corresponding to 10% of accumulation in cumulative distribution of the copper powder was 1.7 μm, the particle diameter ($D_{50}$) corresponding to 50% of accumulation in cumulative distribution of the copper powder was 3.3 μm, and the particle diameter ($D_{90}$) corresponding to 90% of accumulation in cumulative distribution of the copper powder was 6.9 μm. The crystallite diameter ($D_x$) of the copper powder was 130.8 nm on (111) plane, 52.5 nm on (200) plane and 55.9 nm on (220) plane. The average value of the circularity coefficients was 0.93. In the thermomechanical analysis (TMA), the temperature of the test sample was 351° C. at a shrinking percentage of 0.5% (expansion rate=−0.5%), 522° C. at a shrinking percentage of 1.0% (expansion rate=−1.0%), 556° C. at a shrinking percentage of 1.5% (expansion rate=−1.5%), and 671° C. at a shrinking percentage of 6.0% (expansion rate=−6.0%).

The producing conditions and characteristics of the copper powders in these Examples and Comparative Example are shown in Tables 1 through 3. The shrinking percentages of the copper powders with respect to temperature in the thermomechanical analysis (TMA) are shown in FIGS. 1 and 2, and the electron micrographs (magnification of 5000) of the copper powders are shown in FIGS. 3 through 9.

TABLE 1

| | Temp. (° C.) of Molten Metal | Melting Atmosphere | Atomizing Atmosphere | High-Pressure Water | | |
|---|---|---|---|---|---|---|
| | | | | pH | Water Pressure (MPa) | Flow Rate (L/min) |
| Ex.1 | 1600 | nitrogen | nitrogen | 10.3 | 101 | 161 |
| Ex.2 | 1600 | nitrogen | nitrogen | 10.3 | 106 | 165 |
| Ex.3 | 1600 | nitrogen | nitrogen | 10.3 | 105 | 163 |
| Ex.4 | 1500 | nitrogen | nitrogen | 10.3 | 111 | 165 |
| Ex.5 | 1617 | the atmosphere | nitrogen | 10.3 | 104 | 166 |
| Comp.1 | 1200 | nitrogen | nitrogen | 10.3 | 100 | 160 |
| Comp.2 | 1600 | nitrogen | the atmosphere | 10.2 | 117 | 166 |

TABLE 2

| | BET ($m^2$/g) | TAP (g/$cm^3$) | O (wt %) | C (wt %) | O/BET (wt % · g/$m^2$) | Particle Size Distribution (μm) | | |
|---|---|---|---|---|---|---|---|---|
| | | | | | | $D_{10}$ | $D_{50}$ | $D_{90}$ |
| Ex.1 | 0.30 | 4.8 | 0.12 | 0.004 | 0.39 | 1.3 | 3.7 | 8.2 |
| Ex.2 | 0.28 | 4.9 | 0.12 | 0.004 | 0.43 | 1.4 | 3.8 | 7.9 |
| Ex.3 | 0.31 | 4.8 | 0.12 | 0.007 | 0.38 | 1.4 | 3.7 | 6.8 |
| Ex.4 | 0.32 | 4.8 | 0.13 | 0.005 | 0.41 | 1.3 | 3.5 | 7.0 |
| Ex.5 | 0.33 | 4.9 | 0.15 | 0.007 | 0.46 | 1.3 | 3.7 | 8.0 |
| Comp.1 | 0.34 | 4.6 | 0.14 | 0.007 | 0.41 | 1.3 | 3.5 | 6.3 |
| Comp.2 | 0.37 | 4.5 | 0.76 | 0.006 | 2.04 | 1.7 | 3.3 | 6.9 |

TABLE 3

| | $Dx_{(111)}$ (nm) | $Dx_{(200)}$ (nm) | $Dx_{(220)}$ (nm) | Circularity Coefficient | Temp. (° C.) at each Shrinking Percentage | | | |
|---|---|---|---|---|---|---|---|---|
| | | | | | 0.5% | 1.0% | 1.5% | 6.0% |
| Ex.1 | 200.7 | 68.5 | 59.0 | 0.90 | 606 | 622 | 634 | 735 |
| Ex.2 | 136.9 | 47.2 | 44.8 | 0.92 | 640 | 659 | 677 | 788 |
| Ex.3 | 140.1 | 50.2 | 46.2 | 0.92 | 627 | 642 | 663 | 753 |
| Ex.4 | 129.0 | 59.3 | 61.9 | 0.92 | 597 | 608 | 617 | 687 |
| Ex.5 | 160.3 | 65.8 | 66.7 | 0.90 | 632 | 652 | 673 | 811 |
| Comp.1 | 108.3 | 39.9 | 37.0 | 0.89 | 425 | 461 | 507 | — |
| Comp.2 | 130.8 | 52.5 | 55.9 | 0.93 | 351 | 522 | 556 | 671 |

The invention claimed is:

1. A copper powder which has an average particle diameter of 1 to 10 lam and a crystallite diameter $Dx_{(200)}$ of not less than 40 nm on (200) plane thereof, the copper powder consisting of 0.2% by weight or less of oxygen and the balance being copper and unavoidable impurities, the copper powder having a temperature of not lower than 580° C. at a shrinkage percentage of 1.0% in a thermomechanical analysis thereof.

2. A copper powder as set forth in claim 1, which has a circularity coefficient of 0.80 to 0.94.

3. A copper powder as set forth in claim 1, wherein a ratio of the content of oxygen to a BET specific surface area of the copper powder is 0.8 wt %·g/$m^2$ or less.

4. A copper powder as set forth in claim 1, which has a crystallite diameter $Dx_{(111)}$ of not less than 130 nm on (111) plane thereof.

5. A copper powder as set forth in claim 1, wherein the content of oxygen in the copper powder is 0.15% by weight or less.

6. A conductive paste wherein a copper powder as set forth in claim 1 is dispersed in an organic component.

7. A conductive paste as set forth in claim 1, which is a baked type conductive paste.

* * * * *